March 12, 1946.　　T. E. McDOWELL　　2,396,333
MOTOR CONTROL SYSTEM
Filed Jan. 17, 1944
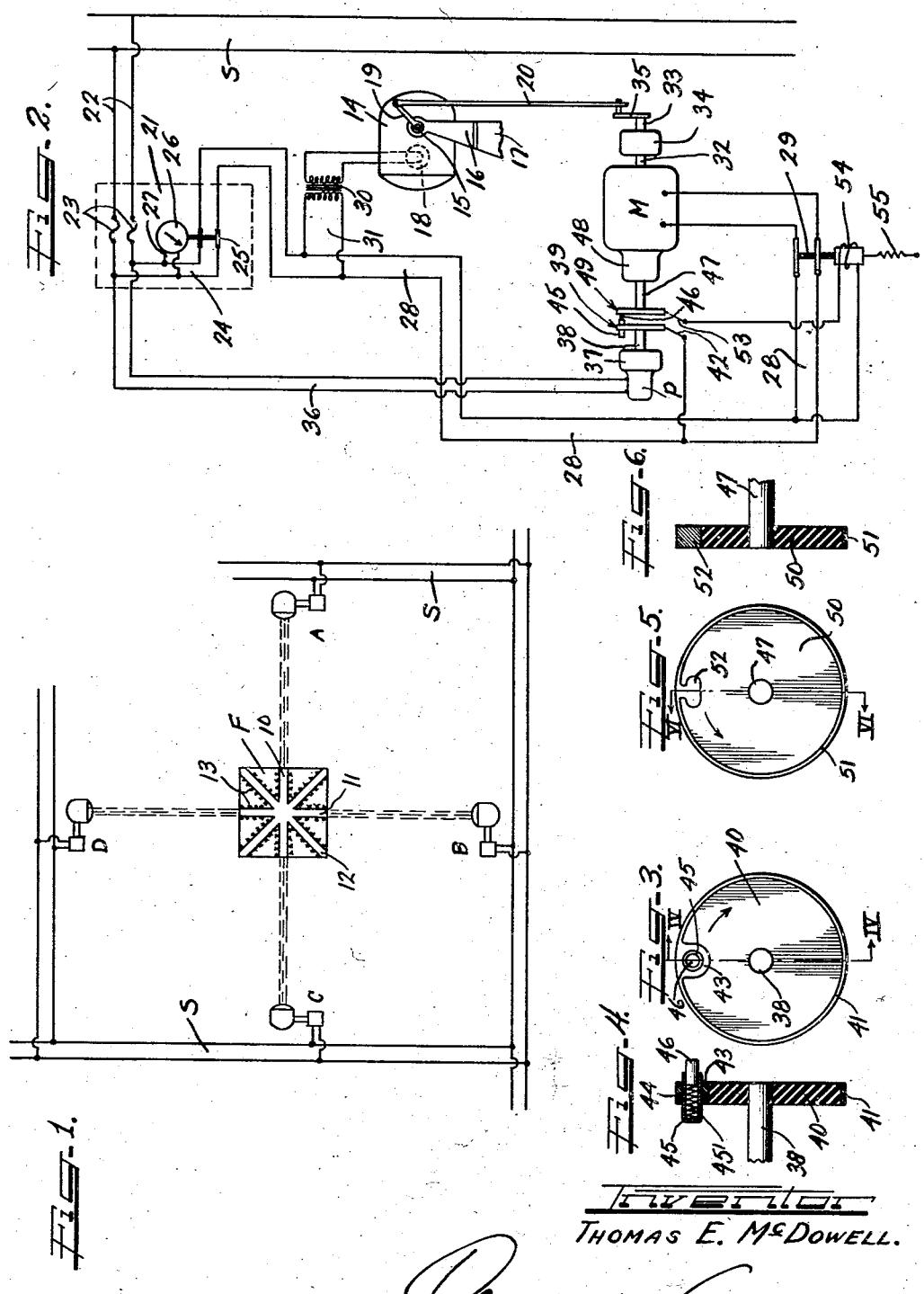
Inventor
THOMAS E. McDOWELL Patented Mar. 12, 1946

2,396,333

UNITED STATES PATENT OFFICE 2,396,333

MOTOR CONTROL SYSTEM

Thomas E. McDowell, Chicago, Ill., assignor to The Pyle-National Company, Chicago, Ill., a corporation of New Jersey Application January 17, 1944, Serial No. 518,493

6 Claims. (Cl. 172—293)

This invention relates to airplane landing field locationing systems adapted particularly for enabling incoming air pilots to determine, just before reaching a landing field, the exact location of the runway, border and other lights on the field are invisible from above by being obscured by a comparatively low ceiling of smoke, fog, haze or the like. A system for this purpose is disclosed in my copending application Serial No. 409,705, filed September 5, 1941, now Patent Number 2,350,407, issued June 6, 1944. In the system of this application light beam projectors or beacons are installed around the field at some distance therefrom with the projectors operated by synchronous electric motors for synchronous oscillation of the beams in proper phase relation at predetermined intervals toward and away from the field, usually in vertical planes passing through the field center.

An important object of the present invention is to provide simplified and improved control means for assuring synchronous operation of the motors and projectors and so that, in the event of failure of power supply to the motors, the motors and projectors will assume their proper predetermined phase relationship when the supply current flow is resumed.

A further object of the invention is to associate with each main or projector driving motor a synchronous pilot motor which runs continuously in synchronism with the power line frequency and controls the current supply line to the main motor in such manner, that, after stoppage of the main motor due to current supply interruption, the main motor before being restarted will be brought back into proper phase relation with the pilot motor and the other projector operating motors of the system, when current supply is resumed.

Another object is to provide an arrangement in which the pilot synchronous motors are permanently directly connected with the main power line for continuously operating when the power line is in service, and to maintain operation of the pilot motors at synchronous speed, as by clock mechanism, when the main line power fails.

A further object is to provide an electric clock at each projector station connected with the power line and controlling a main switch for the supply line to the projector driving motor, with the clock operable mechanically in case of power failure so that upon resumption of power supply the main switches at all of the projector stations may be opened or closed at the same time by the respective clocks, the clocks usually operating to hold the main switches open during the daytime and closing them for night service.

The above referred to and other features of my invention are embodied in the structure shown on the drawing in which:

Figure 1 is a plan view of a landing field with which the projector system is associated;

Figure 2 more or less diagrammatically shows the projector at one of the stations and its driving motor, pilot motor, and circuit controls;

Figure 3 is an enlarged inner face view of a contact member driven by the pilot motor;

Figure 4 is a section on plane IV—IV of Figure 3;

Figure 5 is an enlarged inner face view of a contact member driven by the main motor; and Figure 6 is a section on plane VI—VI of Figure 5.

Figure 1 shows a rectangular landing field F having the longitudinally extending runways 10 and transversely extending runways 11 and also diagonal runways 12. Runway and border lights 13 are usually provided. I have shown four projector or beacon stations A, B, C, and D located at some distance from the edge of the field, probably a mile or two, depending upon the conditions of the terrain around the field. Referring to Figure 2, at each station a beam projector frame 14 is supported by trunnions 15 on a frame 16 which is usually mounted at the top of a tower 17, and within the frame 14 is the lamp 18 whose rays are to be projected. Extending from one of the trunnions of the frame 14 is a crank arm 19 connected by a connecting rod 20 with a motor M which may also be mounted on the tower 17.

The mechanisms at the various stations A, B, C, and D are supplied with alternating current from supply lines S. On Figure 2 the mechanisms and circuits for the station A are more or less diagrammatically shown, the arrangement at the other stations being the same. A service box 21 is provided for each station to which current is conducted through the line 22 from the power line S. In the service box are fuses 23, the current after flowing through the fuses being connected by the line 24 with a main switch 25. This switch is operated by a motor within an electric clock 26 which receives current through the conductors 27. The clock may be of the well known type of astronomical time clock and may be set to open the switch 25 during the day time and close it for night service, and the clock is adapted to operate mechanically as by spring means wound up by a motor, so that the clock may function for proper control of the switch 25 in case of current failure from the power line.

The main switch 25 controls the connection with the power line S of the supply line 28 in which is the control switch 29 for the main motor M which drives the projector 14. The power circuit S may be of 110 volts, 60 cycle alternating current, but the lamp 18 in the projector need require only comparatively small voltage, and therefore this lamp is supplied with current from a transformer 30 in the line 31 extending to the lamp from the supply line 28.

The synchronous driving motor M has its shaft 32 connected with the crank shaft 33 through any suitable reduction gearing 34 for the desired rate of oscillation of the projector 14, the crank arm 35 on the crank shaft 33 being connected by the link 20 with the crank arm 19 of the projector.

Associated with the main motor M is the synchronous pilot motor P whose supply line 36 connects through the fuses 23 directly with the power line. A suitable reduction gearing 37 is interposed between the shaft of the pilot motor and a shaft 38 on the outer end of which is mounted a contact member 39. As best shown in Figures 3 and 4, this member comprises a disk 40 of insulating material surrounded by a metallic contact or slip ring 41 engaged by a brush 42. A metal insert 43 in the disk adjacent to the slip ring is in electrical contact with the ring and may be integral therewith. This insert has the bore 44 therethrough in which is mounted a brush holder 45 for the brush 46, a spring 45' tending to urge the brush outwardly.

The shafts of the motors M and P are in axial alignment, and the shaft of motor M drives a shaft 47 through a suitable reduction gearing 48, a contact member 49 being supported on the outer end of the shaft 47. As best shown in Figures 5 and 6, this contact member comprises a disk 50 of insulating material surrounded by a contact or slip ring 51. A metal insert 52 extends through the disk 50 which is in electrical connection with the slip ring 51 and may be integral therewith. The contact members 39 and 49 are opposite each other as shown on Figure 2, the insert 52 forming a contact for engagement by the brush 46. The reduction gearings 37 and 48 are such that when the motor M is operating the contact member 49 will rotate at the same speed as the contact member 39.

The control switch 29 for the motor M is controlled by an electro-magnetic device such as the solenoid 54 whose core or armature is connected with the switch. One terminal of the solenoid winding is connected with one side of the motor supply line 28 and its other terminal is connected with the brush 53, the brush 42 being connected with the other side of the supply line 28. Upon current flow through the solenoid winding, the solenoid core will be moved to effect closure of the switch 29, and upon the de-energization of the winding, a spring 55 will assist in returning the core for opening of the switch.

It is very important that predetermined relative movements of the various projectors be maintained. For example, it may be desirable that the projectors simultaneously operate for downward swing of the beams to be directed horizontally towards the landing field and then to be swung back upwardly to vertical position. The function of the pilot motors is to maintain such synchronism and phase relationship of the projector operations. When the power line S is on, the pilot motors will be continuously operating, but the supply circuits for the main motors may be interrupted, as when the main switches 25 are opened. The main motors might then move out of phase with each other, and if the motors were restarted from such out of phase positions the projectors driven thereby would be out of phase. However, the pilot motors will function upon closure of the switches 25, to control the motor supply switches 29 for restarting of the motors M in synchronism with the pilot motor, even though all the motors M do not start at the same instant, so that the motors and the projectors would again operate in phase.

Referring to Figure 2, when the power line S is active, and the brush 46 on the contact member 39 is in engagement with the contact 52 of the contact member 49, the circuit for the winding of the solenoid 54 will be closed for closure of the switch 29 for current supply to the motor M, the motor M then running in synchronism with the pilot motor. While these conditions are maintained at the various stations, the motors M will all be in phase with their pilot motors and the projectors will all be operated in power phase relationship. When the switches 25 are opened for day service by the clocks 26 in the service boxes, and the supply lines 28 to the motors M are interrupted, the motors will stop, but they may not all stop in the same position. Referring to Figure 2, upon interruption of current flow through the circuit 28, there will be no current flow through the solenoid circuit and switch 29 will be opened and the motor M will come to a stop, but the contact member 39 would continue to be rotated by the pilot motor to move its brush 46 away from the contact 52 on the contact member 49. If, when switch 25 is closed, which happens when the clock 26 operates for night service, brush 46 is in engagement with contact 52, motor M will start immediately. However, if brush 46 is not in engagement with contact 52 when switch 25 is closed, motor M will not start until contact member 39 has carried the brush around to catch up with contact 52 for closure of the solenoid circuit and reclosure of switch 29, the motor M being then in phase with the pilot motor. This same control is effective at all of the stations by the pilot motors and upon closure of the main switches 25 by the clocks at the stations, the timing of the connections of the motors back into service will be such that the motors and projectors will come into phase with each other and will maintain that phase condition until the current supply is again interrupted.

It may require a time interval for the motors to get back to full speed and into phase with the pilot motors after current supply to the motors has been reestablished, and therefore the contacts 52 of the contact members 49 are sufficiently elongated for retention of contact with the brushes until the motors are fully up to speed.

Although power failure from the power line S is rare, there may be times when such power failures will occur and it is therefore necessary that the pilot motors be kept running at power line frequency so as to be ready to function for control of the motors M when the main line power again comes on. The pilot motor could therefore be constructed to operate like an electric synchronous clock, which, when the power line current is on, would operate electrically to drive the reduction gearing 37 and the contact member 39, and during failure of power the reduction gearing and contact member would be driven mechanically by a spring which is wound up electrically when power is available. Synchronous motors of this type are available on the market and it is therefore unnecessary to show and describe the details herein.

The pilot motors can maintain a rate of revolution per minute different from that of the main motors, but the reduction gearings 37 and 48 must be such that the contact members 39 and 49 will always be driven at the same number of revolutions per minute when the motors M are in circuit. The revolutions per minute of the contact members could be the same as the number of oscillations per minute of the projectors by the motors M, or some even fraction thereof, as one-half, one-third, one-fourth, etc. For example, the pilot motors could run at 3600 revolutions per minute and the main motors at 1800 revolutions per minute, with the rate of oscillation of the projections 20 revolutions per minute, and the contact members 39 and 49 operating at 20 revolutions per minute. Or, with the pilot motors running at 3600 revolutions per minute and the motors M at 1800 revolutions per minute, the reduction gearings 37 and 48 could be set for rotation of the contact members at 10 revolutions per minute, with the projectors being oscillated at the rate of 20 revolutions per minute.

With my improved control, irrespective of the positions of the contacts 52 relative to the brushes 46 at the time of stopping of the motors M, the pilot motors will function, upon resumption of current supply to time the restarting of the motors M for operation thereof in phase with the pilot motors and operation of the projectors in proper phase relationship. With the clocks 26 in the service boxes operable electrically when the power line is functioning, and mechanically when the power line fails, the main switches 25 at the various stations will be simultaneously controlled for opening or closure at predetermined intervals.

It is evident that my improved control means may be used in other systems where devices are to be operated in desired phase relationship by synchronous motors. Changes or modifications may also be made in the control arrangement shown and described without departing from the scope of the invention.

I claim:

1. In a system in which a number of devices are each operated by a synchronous driving motor supplied from an alternating current power line, control means for maintaining operation of the motors and the driven devices in predetermined phase relationship, said control means comprising a continuously running synchronous pilot motor associated with each of the driving motors, a current supply circuit for each driving motor, and control means for said circuit conjointly controlled by the driving motor and the associated pilot motor in such manner that upon opening of the supply circuit and stoppage of the driving motor the circuit will not be reclosed for restarting of the motor until the pilot motor comes into phase with the driving motor whereby upon restarting of the driving motor the device driven thereby will be in phase with the other devices of the system.

2. In control systems in which a number of devices are operated by synchronous driving motors connected with an alternating current power supply line, control means for said driving motors for insuring operation of the devices at all times in predetermined phase relationship, said control means comprising a synchronous pilot motor associated with each driving motor and running continually in synchronism and phase with the frequency of the power line, a supply circuit for connecting each driving motor with the power line, a control switch for opening and closing said supply circuit, electro-magnetic means for operating said switch, a control circuit for said electro-magnetic means, and control means for said electro-magnetic circuit means conjointly controlled by said driving motor and the pilot motor associated therewith in such manner that said switch will be closed when the driving motor is in phase with the pilot motor but will be opened when the driving motor is out of phase with the pilot motor.

3. In combination, a synchronous driving motor, a current supply circuit for connecting said motor with an alternating current power line, a switch in said supply circuit, electro-magnetic means for operating said switch, a circuit for said electro-magnetic means connected to receive current from said supply circuit in advance of said switch, a synchronous pilot motor permanently connected with the power line, a pair of contact members forming terminals for said electro-magnetic means circuit, one of said contact members being continuously rotatable with said pilot motor, the other contact member being rotatable by said driving motor at the same speed as the pilot motor contact when said driving motor is operating, said contact members being free of mechanical interconnection and being in electrical engagement only when said driving motor is in phase with said pilot motor whereby said electromagnet means circuit will be energized for closure of said switch and current flow to the driving motor, stopping of said driving motor upon failure of flow from said power line to said supply line causing said contact members to become disengaged and said electro-magnet means circuit opened for opening of said switch, said switch after resumption of flow from the power line to the supply line being reclosed only after the contact member rotated by the continuously operating pilot motor is reconnected with the contact rotated by the driving motor and the driving motor is in phase with the pilot motor.

4. In a system in which a number of devices are to be operated by synchronous motors in predetermined phase relationship, control means for maintaining such phase relationship comprising a continuously running synchronous pilot motor associated with each driving motor, a current supply circuit for each driving motor, and contact members movable with the driving motor and pilot motor respectively for effecting closing of the supply circuit only when the driving motor is in phase with the pilot motor whereby the driving motors can be started after a period of stoppage thereof only after being brought into phase with their respective pilot motors and whereby the devices operated by said motors will be maintained in proper phase relationship.

5. In a system in which a number of devices are operated by synchronous motors in predetermined phase relationship, control means for maintaining such phase relationship comprising a synchronous pilot motor associated with each driving motor, the pilot motors being permanently connected with an alternating current power line to run continuously in synchronism and phase with each other, a supply circuit for each driving motor, a main switch controlling the connection of said supply circuit with the power line, a second switch controlling the connection of the supply circuit with the driving motor, electro-magnetic control means for said second switch having an energizing circuit, a contact driven by the pilot motor at reduced speed through a circular path, a contact driven by the driving motor at reduced speed through a circular path, said contacts being driven at the same speed when the driving motor is in synchronism with the pilot motor, said contacts being free of mechanical interconnection and forming the terminals of said electro-magnetic control means circuit, said energizing circuit, after closure of said main switch, being closed for closure of said second switch by said electromagnetic control means only when the pilot motor driven contact comes into engagement with the driving motor driven contact and the driving motor is in phase with the pilot motor, whereby closure of the main switches in the system after opening thereof will result in starting of all the driving motors in phase with each other and with the devices operated by the driving motors in their proper phase relationship.

6. In a system in which a number of devices are to be operated by synchronous motors in predetermined phase relationship and in which a supply line is provided for each driving motor for connecting it with a power line, control means for assuring restarting of said driving motors and the devices operated thereby in proper phase relationship upon resumption of power after a power failure, said control means comprising a synchronous pilot motor associated with each driving motor, said pilot motors being permanently connected with the power line to be continuously electrically operated in synchronism and phase relationship with each other when the power is on, and adapted to mechanically maintain such operation upon power failure, a switch in the supply line for each driving motor, means automatically opening said switches upon power failure, and means jointly controlled by each driving motor and its associated pilot motor to be effective upon power return to reclose the supply circuit switch for restarting of the driving motor only when the pilot motor comes into phase with the driving motor.

THOMAS E. McDOWELL.